US011895748B2

(12) United States Patent
Song

(10) Patent No.: US 11,895,748 B2
(45) Date of Patent: Feb. 6, 2024

(54) CURRENT CONTROL FOR LED PIXEL ARRAYS

(71) Applicant: Lumileds LLC, San Jose, CA (US)

(72) Inventor: Zhi Hua Song, Palo Alto, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 17/777,916

(22) PCT Filed: Nov. 20, 2020

(86) PCT No.: PCT/US2020/061419

§ 371 (c)(1),
(2) Date: May 18, 2022

(87) PCT Pub. No.: WO2021/102214

PCT Pub. Date: May 27, 2021

(65) Prior Publication Data

US 2022/0418069 A1 Dec. 29, 2022

Related U.S. Application Data

(60) Provisional application No. 62/938,479, filed on Nov. 21, 2019.

(51) Int. Cl.
*H05B 45/325* (2020.01)
*H05B 45/14* (2020.01)

(52) U.S. Cl.
CPC ........... *H05B 45/325* (2020.01); *H05B 45/14* (2020.01)

(58) Field of Classification Search
CPC ........ H05B 45/11; H05B 45/14; H05B 45/30; H05B 45/325; H05B 45/37; H05B 45/52; H05B 45/54
See application file for complete search history.

(56) References Cited

U.S. PATENT DOCUMENTS 10,129,941 B1 11/2018 Navabi-Shirazi et al.
2004/0155609 A1* 8/2004 Lys ..................... H05B 45/325 315/316

(Continued)

FOREIGN PATENT DOCUMENTS

| | | | |
|---|---|---|---|
| CN | 103857135 B | | 1/2017 |
| CN | 106455216 A | * | 2/2017 |
| CN | 107277966 A | * | 10/2017 |
| TW | 202135598 | | 9/2021 |

(Continued)

OTHER PUBLICATIONS

"International Application Serial No. PCT/US2020/061419, International Search Report dated Feb. 17, 2021", 5 pgs.

(Continued)

*Primary Examiner* — Abdullah A Riyami
*Assistant Examiner* — Syed M Kaiser
(74) *Attorney, Agent, or Firm* — Schwegman, Lundberg & Woessner, P.A.

(57) ABSTRACT

A light-emitting diode (LED) array includes an array of pixel assemblies and a pulse width modulator. The pulse width modulator generates pulse width modulation (PWM) signals for controlling a duty cycle of each of the pixels. The pixel assemblies each include an LED, a switching circuit, and a close loop circuit. The switching circuit receives a PWM signal and alternately turns on and off the LED based on the PWM signal. The close loop circuit regulates an LED current provided by the switching circuit to the LED based on a feedback signal received from the switching circuit.

19 Claims, 6 Drawing Sheets

(56) References Cited

U.S. PATENT DOCUMENTS

| | | | | |
|---|---|---|---|---|
| 2005/0063194 | A1* | 3/2005 | Lys | B60Q 3/85<br>362/489 |
| 2007/0205823 | A1* | 9/2007 | Cho | H05B 45/00<br>327/536 |
| 2008/0042628 | A1* | 2/2008 | Wang | H05B 45/38<br>323/271 |
| 2008/0203946 | A1* | 8/2008 | Ito | H05B 45/48<br>315/307 |
| 2011/0062872 | A1* | 3/2011 | Jin | H05B 45/46<br>257/E21.531 |
| 2012/0280622 | A1* | 11/2012 | Jeong | H05B 45/40<br>315/122 |
| 2015/0312995 | A1* | 10/2015 | Bora | H05B 45/20<br>315/297 |
| 2016/0095181 | A1* | 3/2016 | Schiappelli | H05B 45/38<br>315/210 |

FOREIGN PATENT DOCUMENTS

| | | | |
|---|---|---|---|
| WO | WO-2021102214 | A1 | 5/2021 |
| WO | WO-2021102222 | A1 | 5/2021 |

OTHER PUBLICATIONS

"International Application Serial No. PCT/US2020/061419, Written Opinion dated Feb. 17, 2021", 7 pgs.

"International Application Serial No. PCT/US2020/061433, International Search Report dated Feb. 17, 2021", 4 pgs.

"International Application Serial No. PCT/US2020/061433, Written Opinion dated Feb. 17, 2021", 7 pgs.

"European Application Serial No. 20825307.0, Response to Communication pursuant to Rules 161(1) and 162 EPC filed Dec. 15, 2022", 14 pages.

* cited by examiner

CURRENT CONTROL FOR LED PIXEL ARRAYS

CROSS REFERENCE TO RELATED APPLICATION

This application is a U.S. National Stage Filing under 35 U.S.C. 371 from International Application No. PCT/US2020/061419, filed on Nov. 20, 2020, which claims the benefit of and priority to U.S. Provisional Application No. 62/938,479, filed Nov. 21, 2019, the disclosures of which are hereby incorporated by reference herein in their entireties for all purposes.

TECHNICAL FIELD

The present disclosure relates generally to an LED pulse width modulation circuit usable in micro-LED pixel arrays. More specifically, the disclosure describes a technique that reduces LED current variation and pixel to pixel crosstalk induced during pulse width modulation switching.

BACKGROUND

Micro light emitting diode (micro-LED) arrays are currently being developed for use in lighting and display applications. Micro-LED control systems can support arrays of thousands to millions of microscopic LED pixels that actively emit light and are individually controlled. As compared to backlight LED technologies, micro-LED arrays can have higher brightness and energy efficiency, making them attractive for a variety of applications such as televisions, automotive headlights, and mobile phones. To display an image, the current levels of the micro-LED pixels at different locations on an array can be adjusted individually according to a specific image, light intensity, or color profile.

A micro-LED lighting system can include an LED array matrix having n LED modules, each of which has one or more LEDs connected in series or parallel. An LED control system that has a constant input voltage power supply connected to the LED array matrix can use pulse width modulation (PWM) control for dimming and color tuning functionality. PWM control works by turning on and off the pixels at a certain frequency, in effect adjusting the ratio between the conduction time and the period or cycle time, also known as a duty cycle. The average DC current through a pixel is the product of the current amplitude and the duty cycle.

DESCRIPTION OF EXAMPLE EMBODIMENTS OF THE DISCLOSURE

Overview

Figure 1:
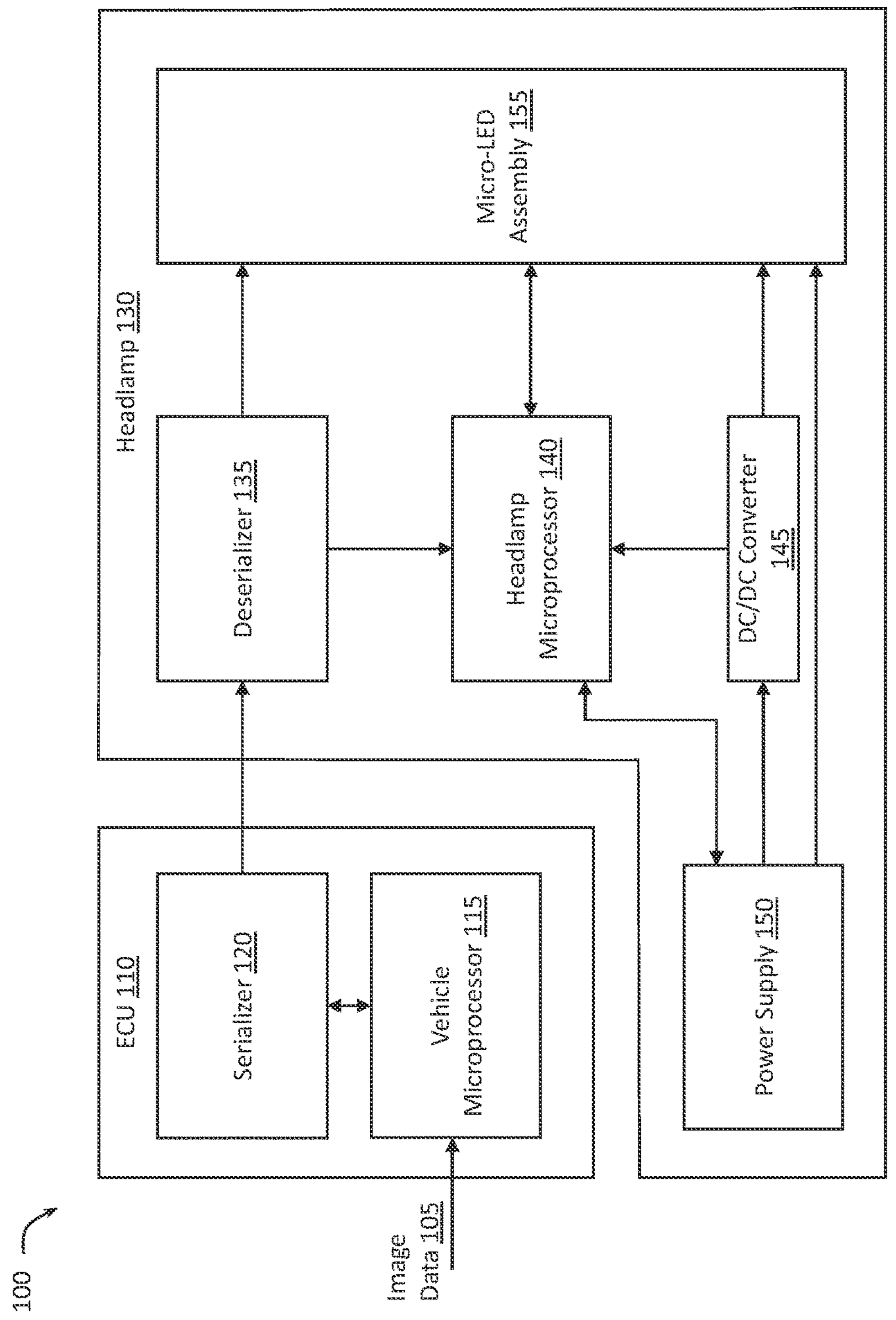
FIG. 1 is a block diagram of an example vehicle headlamp system that includes a micro-LED assembly according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

For purposes of illustrating the LED pixel assemblies described herein, it might be useful to understand phenomena that may come into play in micro-LED assemblies with PWM control. The following foundational information may be viewed as a basis from which the present disclosure may be properly explained. Such information is offered for purposes of explanation only and, accordingly, should not be construed in any way to limit the scope of the present disclosure and its potential applications.

Existing micro-LED arrays that use PWM control typically include, in each pixel, a micro-LED, a PWM switch, and a transistor that acts as a current source for the micro-LED. The transistor receives a current control signal at its gate; the current control signal is used to set a current amplitude for the micro-LED. The micro-LED, PWM switch, and transistor are connected in series, with the micro-LED receiving a fixed input voltage, and the source of the transistor connected to a ground. In a micro-LED array, all of the micro-LEDs, or subsets of the micro-LEDs, receive the same current control signal, so multiple transistor gates are connected to the same control line. In addition, each of the source terminals are connected to a common ground line.

These micro-LED arrays experience current variation caused by the non-zero parasitic resistance of the ground path. This parasitic resistance can include interconnect resistance in an integrated circuit (IC) that has multiple transistors supporting activation of multiple LEDs in the array. In practice, the ground voltage is not zero due to the parasitic resistance associated with a conductive path. As a result, a voltage drop forms between the source terminal of the transistors and the ground. The voltage drop between the transistor and the ground varies with the location of a pixel, where both the parasitic resistance and collective current values can be different. Since the gate voltage is fixed for all pixels, the gate-source voltage of individual transistors differs between pixels, leading to variation in the currents input to the LEDs. This effect can harm the consistency or uniformity of the current magnitude ad brightness of the array matrix.

Another disadvantage associated with using conventional circuitry for PWM control of a micro-LED matrix is crosstalk. The PWM switching can cause Miller capacitances between the gate and drain of each transistor that is charged and discharged, affecting the shared gate voltage and the current setting. Consequently, the switching of one pixel generates crosstalk that can impact operation of other pixels in the array. Existing solutions to resolve this issue often requires extra IC pins and costly external capacitors.

The ground path resistance and crosstalk issues can be of particular importance for large matrix pixel arrays of micro-LEDs that already face power and data management challenges. In many applications, individual light intensity of thousands of emitting pixels may need to be controlled at refresh rates of 30-60 Hz, and fine grained color and image control may be required.

Embodiments of the present disclosure provide LED arrays that decouple the current control from the PWM switching. Each pixel of the LED array includes a switching circuit, which receives the PWM signal and turns the LED on and off, and a close loop circuit, which controls the current amplitude through the LED based on a current control signal. The close loop circuit includes a transistor and an operational amplifier (op-amp). The transistor receives the current control signal and outputs a reference current to the op-amp. The output of the op-amp is coupled to a transistor in the switching circuit. The transistor in the switching circuit generates an LED current that drives the LED; the LED current is based on the output of the op-amp. The switching circuit also provides a feedback signal to the op-amp, and the op-amp controls the LED current based on the feedback signal. While the transistor in the switching circuit may experience Miller capacitances due to the PWM switching, the transistor in the close loop circuit is largely not affected because the op-amp decouples the two transistors, thus minimizing crosstalk between pixels connected to the same current control line. The close loop circuit further includes two resistors, each connected to a respective input of the op-amp and each connected to the ground. The resistors can be selected to greatly reduce the variation between LEDs caused by parasitic resistance.

In one aspect, an LED array includes a pulse width modulator configured to generate a plurality of PWM signals, and a plurality of pixel assemblies. Each pixel assembly includes an LED, a switching circuit, and a close loop circuit. The switching circuit is configured to receive a respective one of the plurality of PWM signals and alternately turn on and off the LED according to the received PWM signal. The close loop circuit is configured to regulate an LED current provided by the switching circuit to the LED based on a feedback signal.

In another aspect, an LED assembly includes an LED, a switching circuit coupled to the LED, and a closed loop circuit. The switching circuit is configured to receive a PWM signal and, based on the PWM signal, alternately switch on and off an input current to the LED. The close loop circuit is configured to regulate the input current to the LED based on a current control signal and feedback from the switching circuit.

In still another aspect, a control circuit for a LED includes a close loop circuit and a switching circuit. The close loop circuit is configured to receive a current control signal and output an LED current regulating signal based on the current control signal. The switching circuit is configured to output an LED current according to a PWM signal, the LED current having an amplitude regulated by the LED current regulating signal received from the close loop circuit, the switching circuit further configured to provide feedback to the close loop circuit for regulating the LED current.

As will be appreciated by one skilled in the art, aspects of the present disclosure, in particular aspects of micro-LED pixel arrays with improved current control, described herein, may be embodied in various manners—e.g. as a method, a system, a computer program product, or a computer readable storage medium. Accordingly, aspects of the present disclosure may take the form of an entirely hardware embodiment, an entirely software embodiment (including firmware, resident software, micro-code, circuit designs, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems or be stored upon manufacturing of these devices and systems.

In the following detailed description, various aspects of the illustrative implementations may be described using terms commonly employed by those skilled in the art to convey the substance of their work to others skilled in the art. For example, the term "connected" means a direct electrical or magnetic connection between the things that are connected, without any intermediary devices, while the term "coupled" means either a direct electrical or magnetic connection between the things that are connected, or an indirect connection through one or more passive or active intermediary devices. The term "circuit" means one or more passive and/or active components that are arranged to cooperate with one another to provide a desired function. The terms "substantially," "close," "approximately," "near," and "about," generally refer to being within +/−20%, preferably within +/−10%, of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

The terms such as "over," "under," "between," and "on" as used herein refer to a relative position of one material layer or component with respect to other layers or components. For example, one layer disposed over or under another layer may be directly in contact with the other layer or may have one or more intervening layers. Moreover, one layer disposed between two layers may be directly in contact with one or both of the two layers or may have one or more intervening layers. In contrast, a first layer described to be "on" a second layer refers to a layer that is in direct contact with that second layer. Similarly, unless explicitly stated otherwise, one feature disposed between two features may be in direct contact with the adjacent features or may have one or more intervening layers.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "A/B/C" means (A), (B), and/or (C).

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side"; such descriptions are used to facilitate the discussion and are not intended to restrict the application of disclosed embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, reference is made to the accompanying drawings that form a part hereof, showing, by way of illustration, some of the embodiments that may be practiced. In the drawings, same reference numerals refer to the same or analogous elements/materials so that, unless stated otherwise, explanations of an element/material with a given reference numeral provided in context of one of the drawings are applicable to other drawings where elements/materials with the same reference numerals may be illustrated. For convenience, if a collection of drawings designated with different letters are present, e.g., FIGS. 2A-2C, such a collection may be referred to herein without the letters, e.g., as "FIG. 2." The accompanying drawings are not necessarily drawn to scale. Moreover, it will be understood that certain embodiments can include more elements than illustrated in a drawing, certain embodiments can include a subset of the elements illustrated in a drawing, and certain embodiments can incorporate any suitable combination of features from two or more drawings.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

In some examples provided herein, interaction may be described in terms of two, three, four, or more electrical components. However, this has been done for purposes of clarity and example only. It should be appreciated that the devices and systems described herein can be consolidated in any suitable manner. Along similar design alternatives, any of the illustrated components, modules, and elements of the accompanying drawings may be combined in various possible configurations, all of which are clearly within the broad scope of the present disclosure. In certain cases, it may be easier to describe one or more of the functionalities of a given set of flows by only referencing a limited number of electrical elements.

The following detailed description presents various descriptions of specific certain embodiments. However, is to be understood that other embodiments may be utilized, and structural or logical changes may be made without departing from the scope of the present disclosure. In general, the innovations described herein can be embodied in a multitude of different ways, for example, as defined and covered by the claims and/or select examples, and the following detailed description is not to be taken in a limiting sense.

Example Systems for Micro-LED Arrays

Micro-LED arrays support applications that benefit from fine-grained intensity, spatial, and temporal control of light distribution. For example, micro-LED arrays can provide precise spatial patterning of emitted light from pixel blocks or individual pixels. Depending on the application, emitted light may be spectrally distinct, adaptive over time, and/or environmentally responsive. Micro-LED arrays may provide pre-programmed light distribution in various intensity, spatial, or temporal patterns. The emitted light may be based at least in part on received sensor data. Associated optics may be distinct at a pixel, pixel block, or device level. Example micro-LED arrays include devices having a commonly controlled central block of high intensity pixels with an associated common optic, and edge pixels that have individual optics. Some applications supported by micro-LED arrays include video lighting, automotive headlights, architectural and area illumination, street lighting, and informational displays.

Vehicle headlamps, or headlights, are one example application of micro-LED arrays. Vehicle headlamps comprised of micro-LED include a large number of pixels and have a high data refresh rate. Automotive headlights that actively illuminate only selected sections of a roadway can be used to reduce problems associated with glare or dazzling of oncoming drivers. For example, using infrared cameras as sensors, micro-LED arrays can activate only those pixels needed to illuminate the roadway, while deactivating pixels that may dazzle pedestrians or drivers of oncoming vehicles. As another example, a micro-LED array may be used to selectively illuminate off-road pedestrians, animals, or signs to improve driver environmental awareness. If pixels of the micro-LED array are spectrally distinct, the color temperature of the light may be adjusted according to respective daylight, twilight, or night conditions. Some pixels may be used for optical wireless vehicle to vehicle communication.

FIG. 1 is a block diagram of an example vehicle headlamp system 100 that includes a micro-LED assembly. The vehicle headlamp system 100 includes an electronic control unit (ECU) 110 and a headlamp 130. While one headlamp 130 is shown in FIG. 1, it should be understood that the vehicle includes two or more headlamps similar to headlamp 130; the other headlamps are similar to the headlamp 130 and operate in a similar manner. Furthermore, other vehicle lights (e.g., running lights, fog lights, etc.) may be similarly configured and operate in a similar manner to the headlamp 130 depicted in FIG. 1.

The ECU 110 is an embedded system within a vehicle that controls electrical systems or subsystems of the vehicle, including the headlamp 130. In addition to controlling headlamps, the ECU 110 may include, for example, controls for engine components, powertrain components, doors, brakes, telematics, battery management, etc. The ECU 110 may be located in or near the engine compartment. The ECU 110 receives image data 105, e.g., from a memory accessible to the ECU 110 that stores different headlamp images used in different settings or applications. A vehicle microprocessor 115 of the ECU 110 may generate or select an image for the headlamp 130. For example, the vehicle microprocessor 115 receives data from one or more environmental sensors, selects an image for the headlamp 130 based on the current environment, and retrieves image data 105 for the selected image. The vehicle microprocessor 115 generates control signals for the headlamp 130 based on the selected image and transmits the control signals to the serializer 120. The serializer 120 serializes the control signals and transmits them over a serial connection, such as an unshielded twisted pair (UTP) or coaxial connection. The serializer 120 may convert the control signals to a low voltage differential signaling (LVDS) format. The physical connection and data format between the ECU 110 and headlamp 130 are selected so that the control signals are reliably transmitted through the vehicle, which may experience a wide temperature variation, moisture, noise, and other adverse conditions.

The headlamp 130 includes a deserializer 135 that reformats the control signals and transmits the control signals to a micro-LED assembly 155. For example, the control signals provided to the micro-LED assembly 155 may include a vertical synch signal, a pixel clock, a pixel enable signal, and a number of pixel data lines. The micro-LED assembly 155 outputs an image according to the control signal. The micro-LED assembly 155 is shown in further detail in FIG. 2, and example pixel assemblies are shown and described in relation to FIGS. 3-6.

The headlamp 130 also includes a headlamp microprocessor 140, a DC/DC converter 145, and a power supply 150. The deserializer 135 also provides control signals to the headlamp microprocessor 140, and may receive feedback (e.g., error information) from the headlamp microprocessor 140 to return to the ECU 110. The headlamp microprocessor 140 controls the power supply 150, which supplies power to the DC/DC converter 145 via one output line and to the micro-LED assembly 155 via a second output line. The voltage supplied by the power supply 150 to the micro-LED assembly 155 is used to power the LED pixels. The voltage sent to the DC/DC converter is used to power internal logic of the headlamp 130, e.g., the headlamp microprocessor 140 and logic internal to the micro-LED assembly 155. The DC/DC converter 145 converts the direct current (DC) signal received from the power supply to a different voltage used to power the headlamp microprocessor 140 and the micro-LED assembly 155 logic. The DC/DC converter 145 distributes the converted DC voltage to the headlamp microprocessor 140 and the micro-LED assembly 155. The headlamp microprocessor 140 also has an interface to the micro-LED assembly 155, e.g., to exchange data, provide clock control, and receive fail data from the micro-LED assembly 155 in the event of a failure.

It should be understood that the vehicle headlamp system 100 is only one example application of a micro-LED array. In another application, a micro-LED assembly 155 is used in a lighting installation to selectively and adaptively illuminate buildings or environments for improved visual display or to reduce lighting costs. For example, in conjunction with tracking sensors and/or cameras, micro-LED arrays may be used to selectively illuminate areas around pedestrians. As another example application, micro-LED arrays are used to project media facades for decorative motion or video effects. Spectrally distinct pixels may be used to adjust the color temperature of lighting, as well as support wavelength specific horticultural illumination.

Street lighting is another example application that benefits from use of micro-LED arrays. A single type of light emitting array may be used to mimic various street light types, allowing, for example, switching between a Type I linear street light and a Type IV semicircular street light by appropriate activation or deactivation of selected pixels. Street lighting costs may be lowered by adjusting light beam intensity or distribution according to environmental conditions or time of use. For example, light intensity and area of distribution may be reduced when pedestrians are not present. If pixels of the micro-LED array are spectrally distinct, the color temperature of the light may be adjusted according to respective daylight, twilight, or night conditions.

Micro-LED arrays are also well suited for supporting applications requiring direct or projected displays. For example, warning, emergency, or informational signs may all be displayed or projected using micro-LED arrays. This allows, for example, color changing or flashing exit signs to be projected. If a micro-LED array is composed of a large number of pixels, textual or numerical information may be presented. Directional arrows or similar indicators may also be provided.

A micro-LED array may be used alone or in conjunction with primary or secondary optics, including lenses or reflectors. To reduce overall data management requirements, some or all of the pixels in the micro-LED array can be limited to on/off functionality or switching between relatively few light intensity levels. Full pixel level control of light intensity is not necessarily supported.

In operation, image data corresponding to pixels in the micro-LED array is used to define response of corresponding pixels in the micro-LED array, with intensity and spatial modulation of the pixels being based on the image(s). To reduce data rate issues, groups of pixels (e.g. 5×5 blocks) can be controlled as single blocks in some embodiments. High speed and high data rate operation may be supported, with pixel values from successive images able to be loaded as successive frames in an image sequence at a rate between, for example, 30 Hz and 100 Hz, e.g., at 60 Hz. In conjunction with a pulse width modulation module, each pixel in the pixel module can be operated to emit light in a pattern and with intensity at least partially dependent on the image held in the image frame buffer.

Example Micro-LED Assembly

Figure 2:
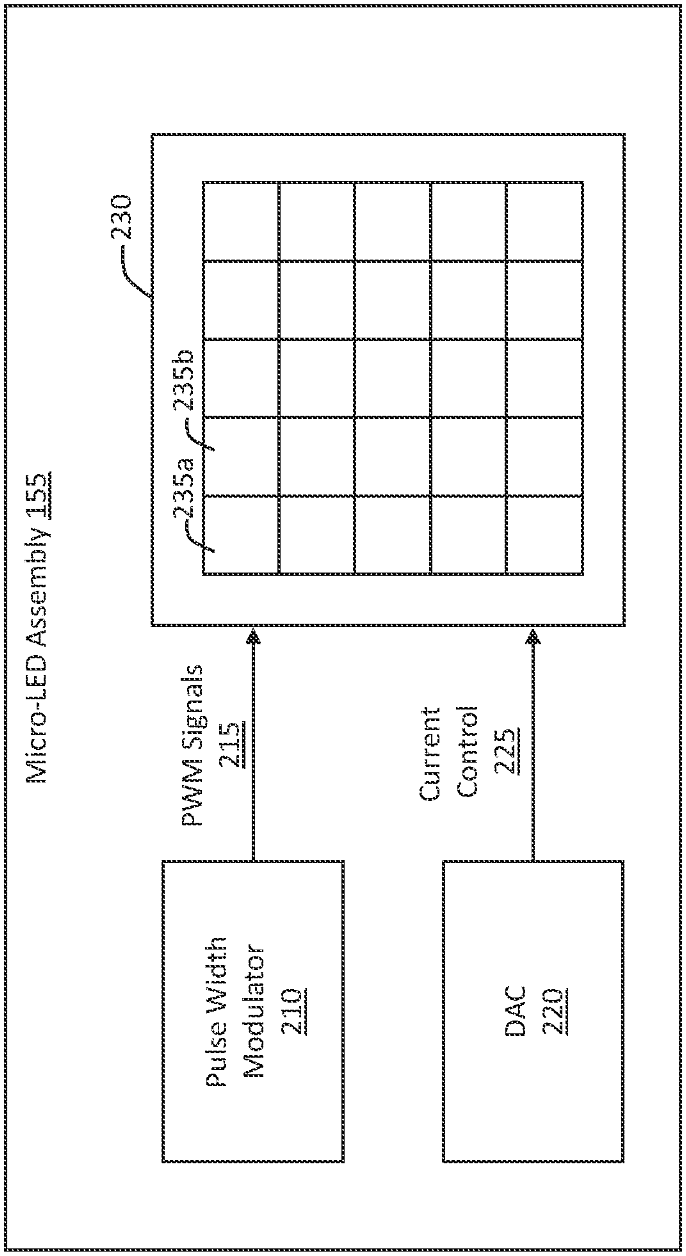
FIG. 2 illustrates an example micro-LED assembly according to some embodiments of the present disclosure.

FIG. 2 illustrates an example of the micro-LED assembly 155 according to some embodiments of the present disclosure. The micro-LED assembly 155 may be used in the vehicle headlamp application, any of the other applications described above, or other potential applications of an LED array. The micro-LED assembly 155 includes a pulse width modulator 210, a digital-to-analog converter (DAC) 220, and a pixel array 230. The pixel array 230 includes pixel assemblies 235, e.g., pixel assemblies 235*a* and 235*b*, which are arranged in a matrix. Each pixel assembly 235 actively emits light and may be individually controlled. While 25 example pixel assemblies are shown in FIG. 2, the pixel array 230 may include thousands to millions of microscopic LED pixel assemblies. To emit light in a pattern or sequence that results in display of an image, the current levels of the micro-LEDs in the pixel assemblies 235 at different locations on an array are adjusted individually according to a specific image. This can be accomplished using pulse width modulation (PWM), which turns on and off the pixels at a certain frequency. During PWM operation, the average DC current through a pixel is the product of the current amplitude and the PWM duty cycle, which is the ratio between the conduction time and the period or cycle time.

The pulse width modulator 210 generates PWM signals 215 that are output to the pixel array 230 to control the PWM duty cycles of the pixels. In some embodiments, the pulse width modulator 210 generates an individual PWM signal 215 for each pixel in the pixel array 230. In other embodiments, one PWM signal may control multiple pixels, e.g., a particular subset of pixels in the pixel array 230. In the vehicle headlamp example described with respect to FIG. 1, the pulse width modulator 210 receives the image control signals from the deserializer 135 and generates the PWM signals 215 based on the image control signals. In other embodiments, another control block within the micro-LED assembly 155 or in another system may generate the image data that is fed to the pulse width modulator 210.

The DAC 220 generates a current control signal 225 provided to the pixel array 230. While each pixel assembly

235 receives a unique PWM signal 215, the full pixel array 230, or blocks of multiple pixel assemblies 235 within the pixel array 230, may receive the same current control signal 225. The DAC 220 receives a control signal indicating the current level to provide from the deserializer 135 (in the vehicle headlamp example) or another digital control interface (e.g., an inter-integrated circuit (I2C) interface).

Example Pixel Assemblies

Figure 3:
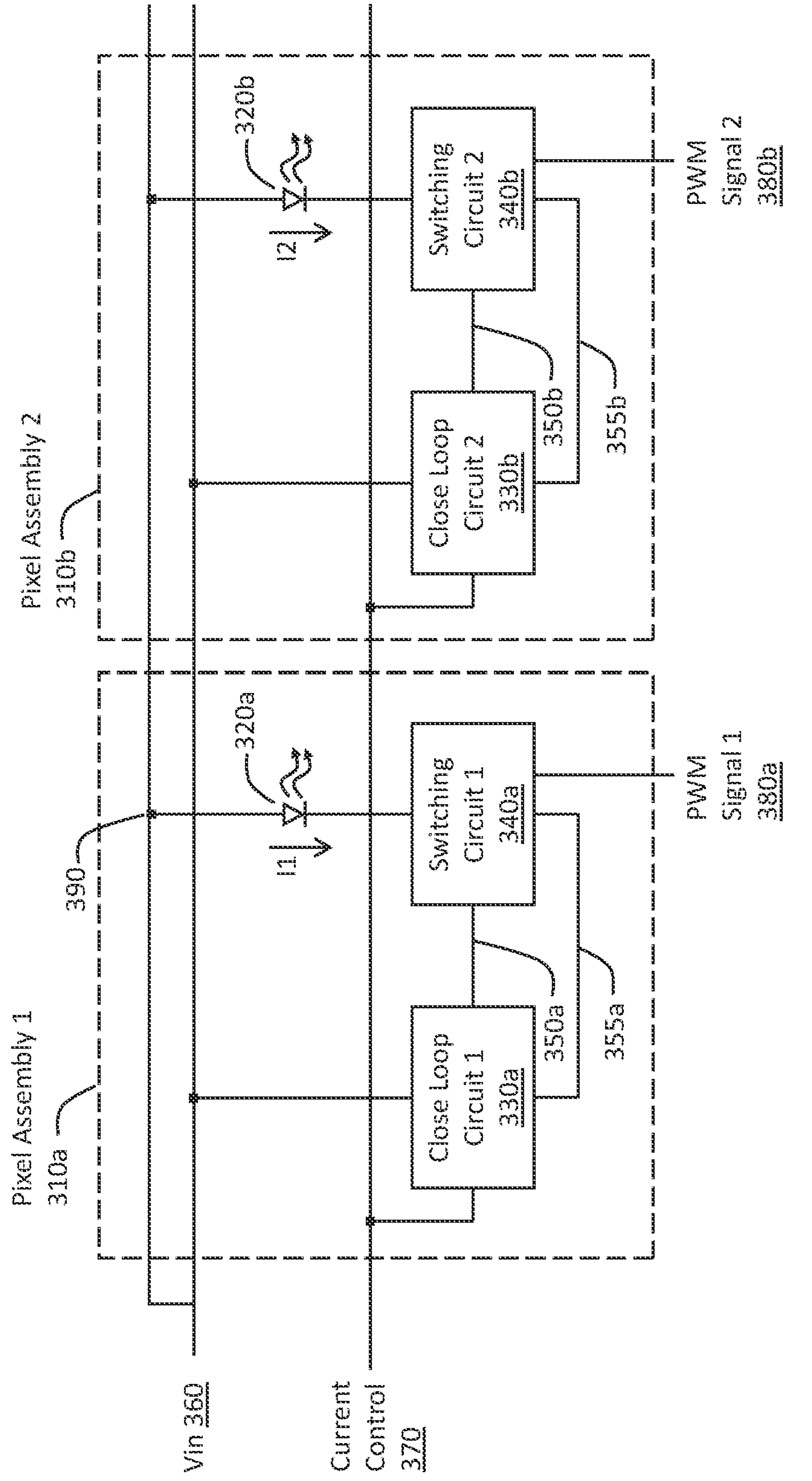
FIG. 3 is a block diagram illustrating two exemplary pixel assemblies according to some embodiments of the present disclosure.

FIG. 3 is a block diagram illustrating two exemplary pixel assemblies according to some embodiments of the present disclosure. The two pixel assemblies 310*a* and 310*b* shown in FIG. 3 are examples of the pixel assemblies 235*a* and 235*b* shown in FIG. 2. Additional pixel assemblies in a micro-LED array may be similarly configured. In FIGS. 3-6, electrical connections are shown using nodes such as node 390; crossings that do not have a node 390 are not electrically connected.

Figure 6:
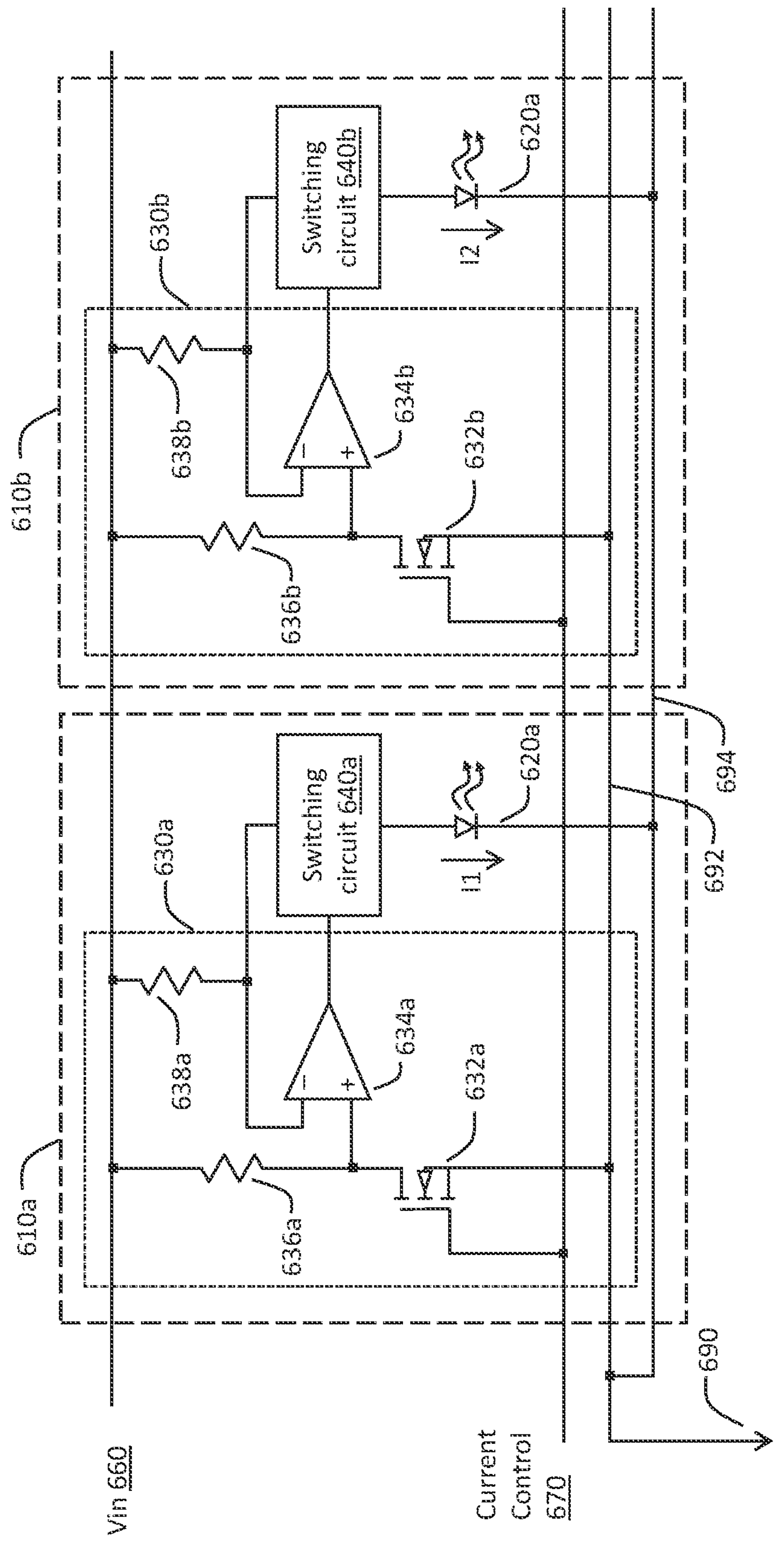
FIG. 6 illustrates a circuit diagram showing another example implementation of two pixel assemblies in which the LEDs are configured as common cathode rather than common anode according to some embodiments of the present disclosure.

Each pixel assembly 310 includes an LED 320, a close loop circuit 330, and a switching circuit 340. The LED 320 may be a micro-LED or another type of LED. In this example, the LED 320 is a common anode LED. In other embodiments, the LED 320 is a common cathode LED; example pixel assemblies with common cathode LEDs are shown in FIG. 6. While one LED 320 is shown in FIG. 3, in other embodiments, the pixel assembly 310 includes multiple LEDs 320 connected in series and/or in parallel. The LED 320 is connected to an input voltage Vin 360, which is an input voltage that powers the pixel assembly 310. In the headlamp example shown in FIG. 1, Vin 360 is provided by the power supply 150. When an LED current, e.g., 11 in pixel assembly 1 310, passes through the LED 320*a*, the LED 320*a* emits light, as indicated by the arrows in FIG. 3.

The switching circuit 340 receives a PWM signal 380 from a pulse width modulator, e.g., one of the PWM signals 215 provided by the pulse width modulator 210. In this example, each switching circuit 340 receives an individual PWM signal 380, e.g., switching circuit 1 340*a* receives PWM signal 1 380*a*, and switching circuit 2 340*b* receives PWM signal 2 380*b*. The switching circuit 340 alternately turns the LED 320 on and off according to the received PWM signal 380. In particular, the switching circuit 340 supplies an LED current (e.g., 11 or 12) to the LED 320 to turn the LED 320 on, and does not supply the LED current to the LED 320 to turn the LED 320 off.

The close loop circuit 330 regulates the LED current supplied to the LED 320 by the switching circuit 340 when the LED 320 is turned on (as controlled by the PWM signal 380). The close loop circuit 330 receives a current control signal 370 (e.g., the current control signal 225 provided by the DAC 220) that is used to set the current level for driving the LED 320. The close loop circuit 330 is coupled to the switching circuit 340 via a current regulating connection 350. The close loop circuit 330 receives feedback from the switching circuit 340 from a feedback connection 355. The close loop circuit 330 regulates the LED current based on the feedback. More particularly, the close loop circuit 330 outputs a voltage to the switching circuit 340 over the current regulating connection 350, where the voltage is tuned by the close loop circuit 330 so that the switching circuit 340 drives the LED 320 at a current level indicated by the current control signal 370. The close loop circuit 330 adjusts its output voltage based on the feedback from the switching circuit 340.

The close loop circuit 330 is powered by the input voltage Vin 360. As shown in FIG. 1, two lines are connected to Vin 360: a first power line that connects to the close loop circuits 330*a* and 330*b*, and a second power line that connects to the LEDs 320*a* and 320*b*. Splitting Vin 360 across two separate lines that span the pixel array or portion of the pixel array prevents parasitic resistance on the power line driving the close loop circuits 330 from impacting the power line driving the LEDs 320.

Example Pixel Assembly Circuit Diagrams

Figure 4:
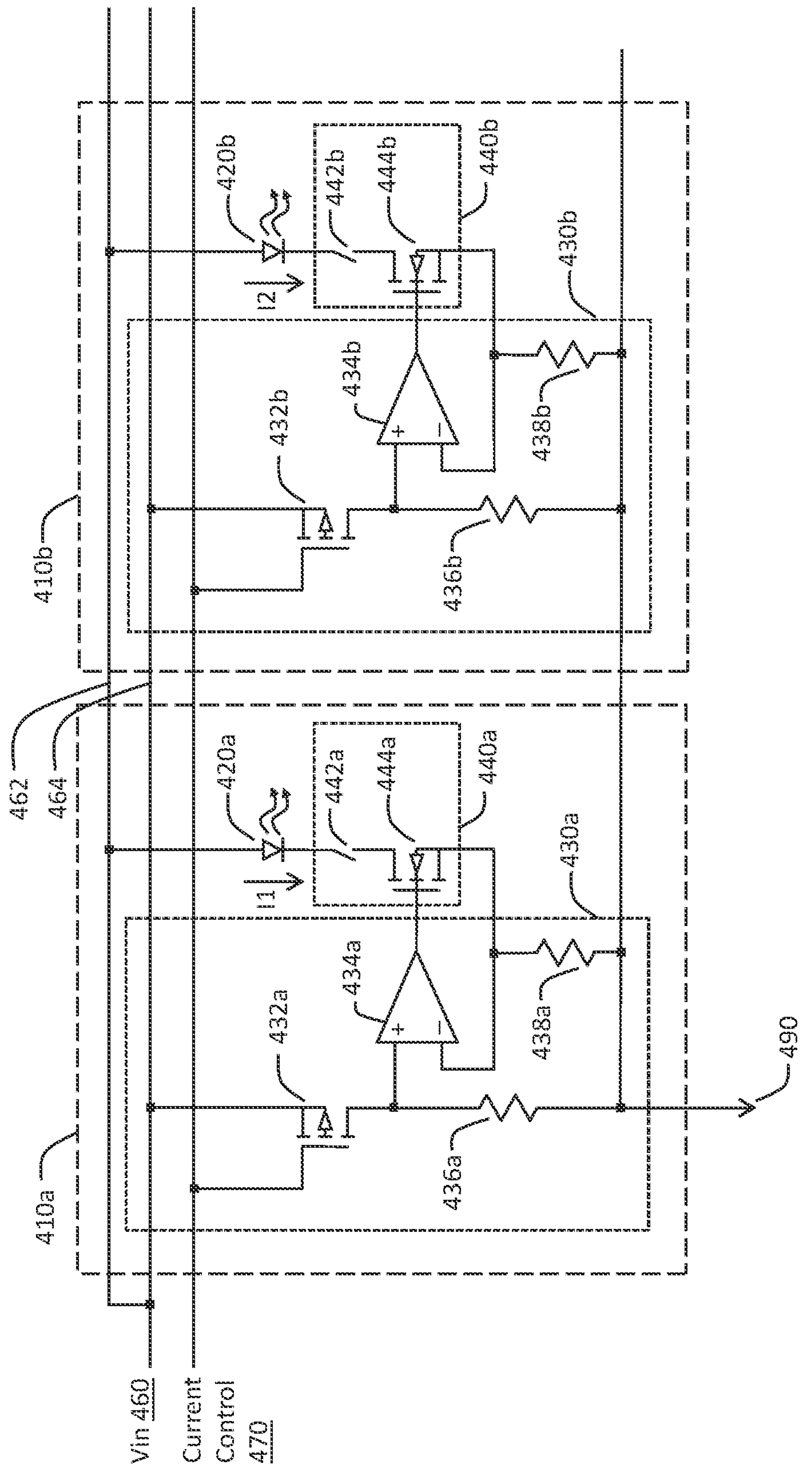
FIG. 4 is a circuit diagram showing an example implementation of two pixel assemblies according to some embodiments of the present disclosure.

FIG. 4 is a circuit diagram showing an example implementation of two pixel assemblies according to some embodiments of the present disclosure. FIG. 4 illustrates example circuit diagrams for two pixel assemblies 410*a* and 410*b*, which are examples of the pixel assemblies 310*a* and 310*b* shown in FIG. 3. Additional pixel assemblies in a micro-LED array may be similarly configured.

Each pixel assembly 410 includes an LED 420, which is similar to the LED 320 described above. Each pixel assembly 410 includes a close loop circuit 430, which is an example implementation of the close loop circuit 330, and a switching circuit 440, which is an example implementation of the switching circuit 340. The pixel assemblies 410 receive an input voltage Vin 460 similar to the input voltage Vin 360, and, like the input voltage Vin 360 in FIG. 3, is provided on two power lines 462 and 464. The pixel assemblies 410 also receive a current control signal 470 similar to the current control signal 370. Each pixel assembly 410 also receives a respective PWM signal (not shown in FIG. 4), which are similar to the PWM signals 380 shown in FIG. 3.

The close loop circuit 430 includes a reference current transistor 432, an op-amp 434, a first resistor 436, and a second resistor 438. The op-amp 434 has two inputs, a non-inverting input (represented by the +sign) and an inverting input (represented by the −sign). The non-inverting input of the op-amp 434 is coupled to the reference current transistor 432. The reference current transistor 432 is a p-type metal-oxide-semiconductor (PMOS) transistor having a gate connected to the current control signal 470, a source connected to the input voltage Vin 460, and a drain connected to a non-inverting input of the op-amp 434. The reference current transistor 432 generates a reference current for the pixel assembly 410 based on the current control signal 470.

The inverting input of the op-amp 434 is coupled to the switching circuit 440 to receive the feedback signal. In particular, the inverting input of the op-amp 434 is coupled to a source of a switching circuit transistor 444 included in the switching circuit 440. The output of the op-amp 434 is coupled to an input of the switching circuit 440. In this example, the output of the op-amp 434 is connected to the gate of the switching circuit transistor 444. The output of the op-amp 434 sets the gate voltage of the switching circuit transistor 444.

The switching circuit transistor 444 is an n-type metal-oxide-semiconductor (NMOS) transistor having a gate connected to the op-amp 434, a source connected to the second resistor 438, and a drain coupled to the LED 420. In this example, a PWM switch 442 sits between the drain of the switching circuit transistor 444 and the LED 420; the PWM switch 442 is opened and closed according to a PWM signal. The switching circuit transistor 444 generates an LED current for driving the LED 420 based on the voltage output of the op-amp 434.

The first resistor 436 is coupled to the non-inverting input of the op-amp 434, and the second resistor 438 is coupled to the inverting input of the op-amp. Each of the resistors 436*a*, 436*b*, 438*a*, and 438*b* is also connected to a common ground 490. Each of the first and second resistors 436 and 438 have a respective resistance R1 and R2. The first resistor senses the reference current from the reference current transistor 432. The second resistor 438 is connected in series with the LED 420, the PWM switch 442, and the switching circuit transistor 444. The second resistor 438 senses the LED current generated by the switching circuit transistor 444 and driving the LED 420.

In operation, the difference between the voltage drop across the first resistor 436 and the voltage drop across the second resistor 438 is amplified by the op-amp 434 to adjust the gate voltage of the switching circuit transistor 444. Consequently, the LED current varies such that the voltage drop across the second resistor 438 changes to become closer to the voltage drop across the first resistor 436. As a result of the closed loop operation, the voltage drops across the first and second resistors 436 and 438 become equal in the steady state. The LED current generated by the switching circuit transistor 444 and driving the LED 420 is determined by the following equation:

$$I_{LED} = \frac{R1}{R2} \times I_{REF}$$

where $I_{LED}$ is the LED current, $I_{REF}$ is the reference current, R1 is resistance of the first resistor 436, and R2 is resistance of the second resistor 438.

During operation, parasitic resistance of conductive path lies in both rails of the power supply lines 462 and 464. Taking the first pixel assembly 410*a* as an example, the ground points of the resistors 436*a* and 438*a* sit in the same pixel and can be considered the same, so there is little parasitic effect. The parasitic resistance at Vin 460, however, is spread over the entire array, which can affect the source voltage of the reference current transistor 432. Hence, both the reference current and the LED current may vary since the gate voltage at the reference current transistor 432 (i.e., the current control signal 470) is fixed. To resolve this issue, the path of Vin 460 is split into a first line 462 for the LEDs 420 and a second line 464 for the reference current transistors 432. From the equation for $I_{LED}$ above, the reference current can be designed to be smaller than the LED current by selecting a large R1 to R2 ratio. For example, R1 may be 5 to 50 times the resistance of R2. By selecting a large R1 to R2 ratio, the voltage drop on the parasitic resistance at Vin line 464 is significantly reduced and the impact on current variation is minimized. Therefore, using two power lines reduces or eliminates the impact of the higher parasitic voltage drop on the power line 462 driving the LEDs 420.

The circuit shown in FIG. 4 has a further advantage in crosstalk reduction due to the decoupling effect of the op-amp 434. Although the gate of the switching circuit transistor 444 is still charged and discharged by Miller capacitances during switching of the PWM switch 442, the Miller capacitances largely do not impact the reference current transistor 432 because of the op-amp 434 separating the two transistors 432 and 444.

Figure 5:
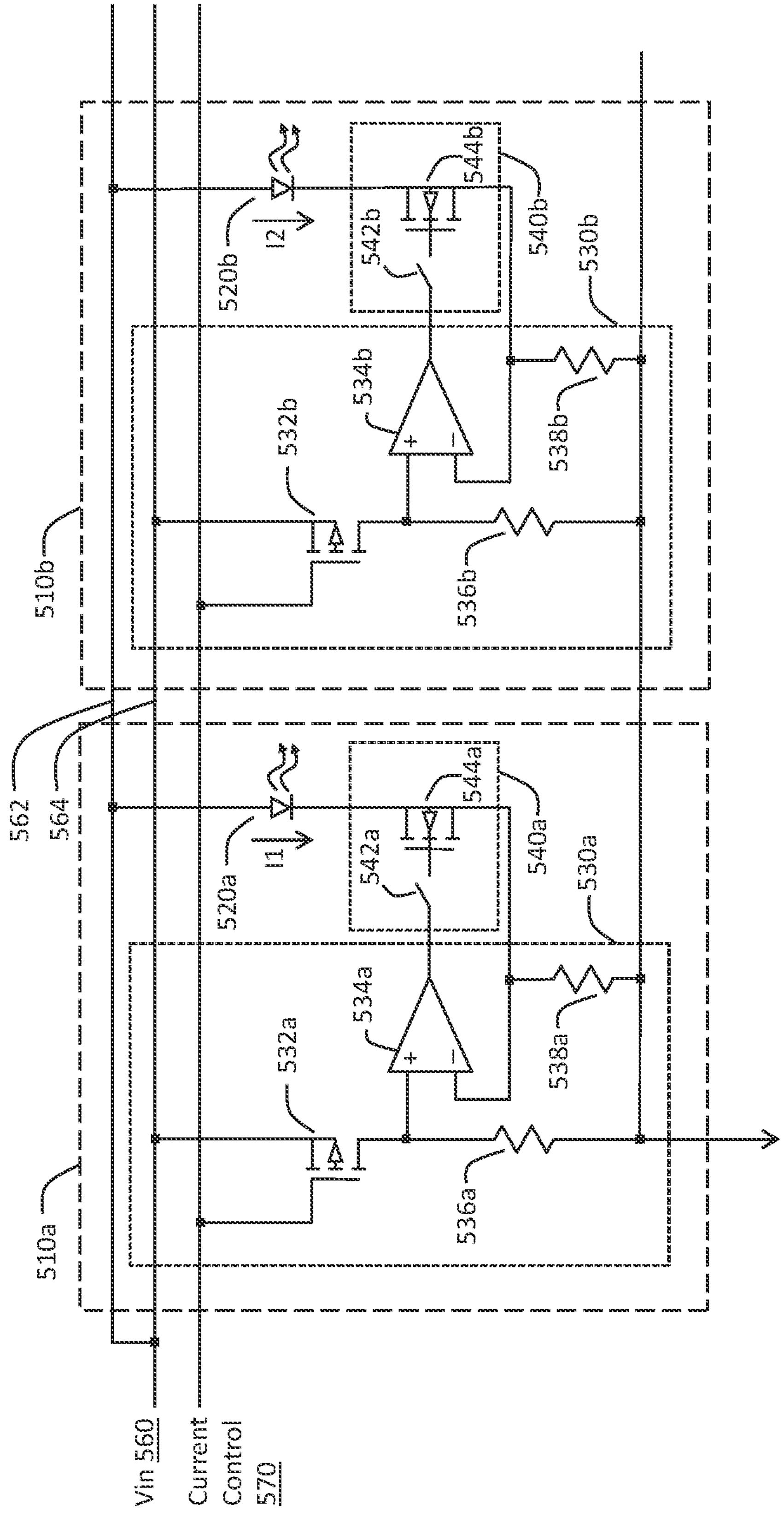
FIG. 5 illustrates a circuit diagram showing a second example implementation of the switching circuit according to some embodiments of the present disclosure.

FIG. 5 illustrates a circuit diagram showing a second example implementation of the switching circuit according to some embodiments of the present disclosure. FIG. 5 illustrates example circuit diagrams for two pixel assemblies 510*a* and 510*b*, which are examples of the pixel assemblies 310*a* and 310*b* shown in FIG. 3. Additional pixel assemblies in a micro-LED array may be similarly configured.

Each pixel assembly 510 includes an LED 520, which is similar to the LED 320 described above. Each pixel assembly 510 includes a close loop circuit 530, which is an example of the close loop circuit 330, and a switching circuit 540, which is an example of the switching circuit 340. The components of the close loop circuits 530 (i.e., the reference current transistor 532, the op-amp 534, and first and second resistors 536 and 538) correspond to the components 432-438 of the close loop circuits 430 described with respect to FIG. 4, and the close loop circuits 530 have the same arrangement as the close loop circuits 430. Furthermore, the pixel assemblies 510 receive an input voltage Vin 560 which is similar to the input voltages 360 and 460, and, like the input voltages in FIGS. 3 and 4, is provided on two power lines 562 and 564. The pixel assemblies 510 also receive a current control signal 570 which is similar to the current control signals 370 and 470. Each pixel assembly 510 also receives a respective PWM signal (not shown in FIG. 5), which are similar to the PWM signals 380 shown in FIG. 3.

In FIG. 5, the switching circuits 540 have a PWM switch 542 and a switching circuit transistor 544. As in FIG. 4, the inverting input of the op-amp 534 is coupled to a source of a switching circuit transistor 544. The output of the op-amp 534 is coupled to an input of the switching circuit 540. In this example, the PWM switch 542 sits at the input of the switching circuit 540, and the PWM switch 542 is connected to the gate of the switching circuit transistor 544. When the PWM switch 542 is closed, the output of the op-amp 534 is coupled to the switching circuit transistor 544 and sets the gate voltage of the switching circuit transistor 544. This arrangement may have greater efficiency than the circuit arrangement shown in FIG. 4 because the gate terminal of the switching circuit transistor 544 only consumes a small current to charge and discharge the parasitic capacitances during the PWM switching. Additional circuit characteristics and advantages are similar to those described above, e.g., with respect to FIGS. 3 and 4.

FIG. 6 illustrates a circuit diagram showing another example implementation of two pixel assemblies in which the LEDs are configured as common cathode rather than common anode according to some embodiments of the present disclosure. FIG. 6 illustrates example circuit diagrams for two pixel assemblies 610*a* and 610*b*, which are examples of the pixel assemblies 235*a* and 235*b* shown in FIG. 2. Additional pixel assemblies in a micro-LED array may be similarly configured.

In the example shown in FIG. 6, the LEDs 620 are configured as common cathode rather than common anode connected as in FIGS. 3-5. The circuit is reversed relative to the circuits shown in FIGS. 4 and 5 such that the LEDs 620 and reference current transistors 632 are connected to ground 690, rather than to Vin 660. In addition, the op-amps 634 and resistors 636 and 638 are connected to Vin 660, rather than to ground 690. In this example, the ground line 690 is split into two rails, with one line 694 connected to the LEDs 620 and the other line 692 connected to the reference current transistors 632. The switching circuit 640 may have either of the switching circuit designs shown in FIG. 4 or 5, or another switching circuit configuration may be used. The current control signal 670 is similar to the current control signals 370 and 470, described above. The operational characteristics and advantages of the circuit shown in FIG.

6 are similar to the characteristics and advantages described above, e.g., with respect to FIGS. 3-5.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

It should be appreciated that the electrical circuits of the accompanying drawings and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

In some embodiments, any number of electrical circuits of the accompanying drawings may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer readable storage medium comprising instructions to allow a processor to carry out those functionalities.

In some embodiments, the electrical circuits of the accompanying drawings may be implemented as stand-alone modules (e.g., a device with associated components and circuitry configured to perform a specific application or function) or implemented as plug-in modules into application specific hardware of electronic devices. Note that some embodiments of the present disclosure may be readily included in a system on chip (SOC) package, either in part, or in whole. An SOC represents an integrated circuit (IC) that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of any of the devices and systems described herein may also be implemented with respect to the methods or processes described herein and specifics in the examples may be used anywhere in one or more embodiments.

SELECT EXAMPLES

Example 1 provides an LED array that includes a pulse width modulator configured to generate a plurality of PWM signals and a plurality of pixel assemblies. Each pixel assembly includes an LED, a switching circuit configured to receive a respective one of the plurality of PWM signals and alternately turn on and off the LED according to the received PWM signal, and a close loop circuit configured to regulate an LED current provided by the switching circuit to the LED based on a feedback signal.

Example 2 includes the LED array of example 1, where the close loop circuit is configured to receive a feedback signal from the switching circuit and adjust a voltage applied to the switching circuit based on the feedback signal, and the LED current is based on the voltage applied to the switching circuit.

Example 3 includes the LED array of example 1 or 2, where the close loop circuit includes an op-amp having a first input, a second input, and an output, the first input coupled to a reference current transistor, the second input coupled to the switching circuit to receive the feedback signal, and the output coupled to an input of the switching circuit.

Example 4 includes the LED array of example 3, where the close loop circuit further includes a first resistor coupled to the first input, the first resistor having a first resistance, and a second resistor coupled to the second input, the second resistor having a second resistance.

Example 5 includes the LED array of example 4, where a current provided to the LED by the switching circuit is equal to a reference current from the reference current transistor times a ratio of the first resistance and second resistance.

Example 6 includes the LED array of example 4 or 5, where the reference current transistor is a PMOS transistor having a source coupled to an input voltage, a gate coupled to a current control signal, and a drain coupled to the first input of the op-amp.

Example 7 includes the LED array of any of examples 3-6, where the switching circuit includes a switching circuit transistor having a gate voltage set by the output of the op-amp.

Example 8 includes the LED array of example 7, where the switching circuit transistor is an NMOS transistor that further includes a source coupled to the second resistor and a drain coupled to the LED.

Example 9 provides an LED assembly that includes an LED, a switching circuit coupled to the LED, and a close loop circuit. The switching circuit is configured to receive a PWM signal and, based on the PWM signal, alternately switch on and off an input current to the LED. The close loop circuit is configured to regulate the input current to the LED based on a current control signal and feedback from the switching circuit.

Example 10 includes the LED assembly of example 9, where the close loop circuit includes an op-amp having a first input, a second input, and an output, the first input coupled to a reference current transistor, the second input coupled to the switching circuit to receive the feedback from the switching circuit, and the output coupled to an input to the switching circuit.

Example 11 includes the LED assembly of example 10, where the reference current transistor receives the current control signal and outputs a reference current based on the current control signal.

Example 12 includes the LED assembly of example 11, where the close loop circuit further includes a first resistor coupled to the first input, the first resistor having a first resistance, and a second resistor coupled to the second input, the second resistor having a second resistance.

Example 13 includes the LED assembly of example 12, where the input current to the LED is equal to the reference current times a ratio of the first resistance and second resistance.

Example 14 includes the LED assembly of any of examples 11-13, where the reference current transistor is a PMOS transistor having a source coupled to an input voltage, a gate coupled to the current control signal, and a drain coupled to the first input of the op-amp.

Example 15 includes the LED assembly of any of examples 10-14, where the switching circuit includes a switching circuit transistor having a gate voltage set by the output of the op-amp.

Example 16 includes the LED assembly of example 15, where the switching circuit transistor is an NMOS transistor that further includes a source coupled to the second resistor and a drain coupled to the LED.

Example 17 provides a control circuit for a LED that includes a close loop circuit and a switching circuit. The close loop circuit is configured to receive a current control signal and output an LED current regulating signal based on the current control signal. The switching circuit is configured to output an LED current according to a PWM signal, the LED current having an amplitude regulated by the LED current regulating signal received from the close loop circuit, the switching circuit further configured to provide feedback to the close loop circuit for regulating the LED current.

Example 18 includes the control circuit of example 17, where the close loop circuit includes an op-amp having a first input, a second input, and an output, the first input coupled to a reference current transistor, the second input coupled to the switching circuit to receive the feedback from the switching circuit, and the output coupled to an input to the switching circuit.

Example 19 includes the control circuit of example 18, where the reference current transistor receives the current control signal and outputs a reference current based on the current control signal.

Example 20 includes the control circuit of example 19, where the close loop circuit further includes a first resistor coupled to the first input, the first resistor having a first resistance, and a second resistor coupled to the second input, the second resistor having a second resistance, where the LED current is equal to the reference current times a ratio of the first resistance and second resistance.

Example 21 provides an LED array that includes a plurality of LEDs, a pulse width modulator configured to supply PWM signals to the plurality of LEDs, and a plurality of control circuits each coupled to a respective LED of the plurality of LEDs. Each of the control circuits includes a transistor coupled to the LED and an op-amp coupled the transistor and configured to control a current provided by the transistor to the LED.

Example 22 includes the LED array of example 21, where each of the plurality of control circuits includes a second transistor coupled to an input of the op-amp and configured to set a reference current for the LED.

Example 23 includes the LED array of example 22, where the second transistor is a PMOS transistor.

Example 24 includes the LED array of any of examples 21-23, where the transistor is an NMOS transistor.

Example 25 includes the LED array of any of examples 21-24, where each of the control circuits further includes a PWM switch and a resistor, where the LED is connected in series with the PWM switch, the transistor, and the resistor, the resistor configured to sense the current provided by the transistor to the LED.

Example 26 includes the LED array of any of examples 21-25, where each of the plurality of LEDs is a common anode LED.

Example 27 includes the LED array of any of examples 21-25, where each of the plurality of LEDs is a common cathode LED.

Example 28 includes the LED array of any of examples 21-27, where each of the control circuits further includes a resistor and a PWM switch, the PWM switch connected between the transistor and the op-amp, where the LED is connected in series to the transistor and the resistor, the resistor configured to sense the current provided by the transistor to the LED.

Example 29 provides a pixel of a micro-LED array that includes a micro-LED, a switching circuit coupled to the micro-LED, a transistor, and an op-amp. The switching circuit is configured to receive PWM signals and control activation of the micro-LED based on the PWM signals. The transistor is configured to set a reference current for the pixel. The op-amp has an input coupled to an output of the transistor and an output coupled to the switching circuit.

Example 30 includes the pixel of example 29, where the transistor is a PMOS transistor.

Example 31 includes the pixel of example 29 or 30, where the switching circuit includes an NMOS transistor.

Example 32 includes the pixel of any of examples 29-31, where the micro-LED is connected in series to a PWM switch, the transistor, and a resistor, the resistor configured to sense a current through the micro-LED.

Example 33 includes the pixel of any of examples 29-32, where the micro-LED is one pixel of a matrix pixel array.

Example 34 includes the pixel of any of examples 29-33, where the micro-LED is a common anode LED.

Example 35 includes the pixel of any of examples 29-33, where the micro-LED is a common cathode LED.

Example 36 includes the pixel of any of examples 29-35, further including a PWM switch connected between the transistor and the op-amp, where the micro-LED is connected in series to the transistor and a resistor, the resistor configured to sense a current through the micro-LED.

Example 37 provides a control method for an LED array that includes arranging a plurality of LEDs in a matrix pixel array, each of the plurality of LEDs connected to a respective one of a plurality of transistors; supplying PWM signals to the plurality of LEDs; and controlling a current to each of the plurality of LEDs using a respective plurality of op-amps, each op-amp coupled to a respective LED by a respective one of the plurality of transistors.

Example 38 includes the control method of example 37, where a second plurality of transistors sets a reference current for a respective one of the plurality of LEDs, the second plurality of transistors each coupled to an input of a respective one of the plurality of op-amps.

Example 39 includes the control method of example 38, where the first plurality of transistors are NMOS transistors, and the second plurality of transistors are PMOS transistors.

Example 40 includes the control method of any of examples 37-39, where each of the plurality of LEDs is connected in series to a PWM switch configured to receive one of the PWM signals, the respective one of the plurality of transistors, and a resistor, and the resistor senses the current applied to the LED.

The invention claimed is:

1. A micro-light-emitting diode (LED) array comprising:
a pulse width modulator configured to generate a plurality of pulse width modulation (PWM) signals;
a first power supply line;
a second power supply line; and
a plurality of pixel assemblies, each pixel assembly comprising:
an LED coupled to the first power supply line;
a switching circuit configured to receive a respective, different PWM signal of the plurality of PWM signals and alternately turn on and off the LED according to the received PWM signal; and
a close loop circuit coupled to the second power supply line and configured to regulate an input current provided by the switching circuit to the LED based on a feedback signal.

2. The LED array of claim 1, wherein the close loop circuit is configured to receive a feedback signal from the switching circuit and adjust a voltage applied to the switching circuit based on the feedback signal, wherein the input current to the LED is based on the voltage applied to the switching circuit.

3. The LED array of claim 1, wherein the close loop circuit comprises an operational amplifier (op-amp) having a first input, a second input, and an output, the first input coupled to a reference current transistor, the second input coupled to the switching circuit to receive the feedback signal, and the output coupled to an input of the switching circuit.

4. The LED array of claim 3, wherein the close loop circuit further comprises a first resistor coupled to the first input, the first resistor having a first resistance, and a second resistor coupled to the second input, the second resistor having a second resistance.

5. The LED array of claim 4, wherein a current provided to the LED by the switching circuit is equal to a reference current from the reference current transistor times a ratio of the first resistance and second resistance.

6. The LED array of claim 4, wherein the reference current transistor is a p-type metal-oxide-semiconductor (PMOS) transistor having a source coupled to an input voltage, a gate coupled to a current control signal, and a drain coupled to the first input of the op-amp.

7. The LED array of claim 4, wherein the switching circuit comprises a switching circuit transistor having a gate voltage set by the output of the op-amp, wherein the switching circuit transistor and the reference current transistor are electrically coupled only through the op-amp and ground.

8. The LED array of claim 7, wherein the switching circuit transistor is a n-type metal-oxide-semiconductor (NMOS) transistor that further comprises a source coupled to the second resistor and a drain coupled to the LED.

9. A light-emitting diode (LED) pixel assembly comprising:
an LED configured to receive power from a first supply line;
a switching circuit coupled to the LED, the switching circuit configured to receive a pulse width modulation (PWM) signal and, based on the PWM signal, alternately switch on and off an input current to the LED; and
a close loop circuit configured to receive power from a second, different supply line and configured to regulate the input current to the LED based on a current control signal and feedback from the switching circuit.

10. The LED pixel assembly of claim 9, wherein the close loop circuit comprises an operational amplifier (op-amp) having a first input, a second input, and an output, the first input coupled to a reference current transistor, the second input coupled to the switching circuit to receive the feedback from the switching circuit, and the output coupled to an input to the switching circuit.

11. The LED pixel assembly of claim 10, wherein the reference current transistor receives the current control signal and outputs a reference current based on the current control signal.

12. The LED pixel assembly of claim 11, wherein the close loop circuit further comprises a first resistor coupled to the first input, the first resistor having a first resistance, and a second resistor coupled to the second input, the second resistor having a second resistance.

13. The LED pixel assembly of claim 12, wherein the input current to the LED is equal to the reference current times a ratio of the first resistance and second resistance.

14. The LED pixel assembly of claim 11, wherein the reference current transistor is a p-type metal-oxide-semiconductor (PMOS) transistor having a source coupled to an input voltage, a gate coupled to the current control signal, and a drain coupled to the first input of the op-amp.

15. The LED pixel assembly of claim 12, wherein the switching circuit comprises a switching circuit transistor having a gate voltage set by the output of the op-amp.

16. The LED pixel assembly of claim 15, wherein the switching circuit transistor is a n-type metal-oxide-semiconductor (NMOS) transistor that further comprises a source coupled to the second resistor and a drain coupled to the LED.

17. A control circuit for a light emitting diode (LED) pixel comprising:
a close loop circuit configured to receive a current control signal and output an LED current regulating signal based on the current control signal, the close loop circuit comprises an operational amplifier (op-amp) having a first input, a second input, and an output, the first input coupled to a reference current transistor; and
a switching circuit configured to output an LED current according to a pulse width modulation (PWM) signal, the LED current having an amplitude regulated by the LED current regulating signal received from the close loop circuit, the switching circuit further configured to provide feedback to the close loop circuit for regulating the LED current, the second input coupled to the switching circuit to receive the feedback signal, and the output coupled to an input of the switching circuit, the switching circuit comprises a switching circuit transistor having a gate voltage set by the output of the op-amp, the switching circuit transistor and the reference current transistor are electrically coupled only through the op-amp and ground.

18. The control circuit of claim 17, wherein the reference current transistor receives the current control signal and outputs a reference current based on the current control signal.

19. The control circuit of claim 18, wherein the close loop circuit further comprises a first resistor coupled to the first input, the first resistor having a first resistance, and a second resistor coupled to the second input, the second resistor having a second resistance, wherein the LED current is equal to the reference current times a ratio of the first resistance and second resistance.

* * * * *